(12) United States Patent
Dong et al.

(10) Patent No.: US 10,578,757 B2
(45) Date of Patent: Mar. 3, 2020

(54) OMNIDIRECTIONAL VECTOR SEISMIC DATA PROCESSING METHOD AND APPARATUS, COMPUTER-READABLE STORAGE MEDIUM AND DEVICE

(71) Applicant: PetroChina Company Limited, Beijing (CN)

(72) Inventors: Shitai Dong, Beijing (CN); Likang Chen, Beijing (CN); Xiaodong Zheng, Beijing (CN); Yan Zhang, Beijing (CN); Zhan'an Xie, Beijing (CN)

(73) Assignee: PetroChina Company Limited, Beijing (CN)

( * ) Notice: Subject to any disclaimer, the term of this patent is extended or adjusted under 35 U.S.C. 154(b) by 131 days.

(21) Appl. No.: 15/965,503

(22) Filed: Apr. 27, 2018

(65) Prior Publication Data

US 2018/0246238 A1 Aug. 30, 2018

Related U.S. Application Data

(63) Continuation of application No. PCT/CN2016/099825, filed on Sep. 23, 2016.

(30) Foreign Application Priority Data

Oct. 28, 2015 (CN) .......................... 2015 1 0716250

(51) Int. Cl.
*G01V 1/28* (2006.01)
*G01V 1/18* (2006.01)
(Continued)

(52) U.S. Cl.
CPC .............. *G01V 1/284* (2013.01); *G01V 1/181* (2013.01); *G01V 1/184* (2013.01); *G01V 1/282* (2013.01);
(Continued)

(58) Field of Classification Search
CPC ... G01V 1/28; G01V 1/18; G01V 1/30; G01V 1/181; G01V 1/282; G01V 1/284;
(Continued)

(56) References Cited

U.S. PATENT DOCUMENTS 4,791,617 A 12/1988 Seymour
5,790,388 A 8/1998 Buckingham
(Continued)

FOREIGN PATENT DOCUMENTS

CN 2047790 U 11/1989
CN 2453455 Y 10/2001
(Continued)

OTHER PUBLICATIONS

Carrion, et al., "Detailed Modeling of Designs for the Polar Seismic TETwalker," Center for Remote Sensing of Ice Sheets, Technical Report, Nov. 8, 2007.
(Continued)

*Primary Examiner* — Hovhannes Baghdasaryan
*Assistant Examiner* — Amie M Ndure
(74) *Attorney, Agent, or Firm* — Hamilton, Brook, Smith & Reynolds, P.C.

(57) ABSTRACT

The invention discloses an omnidirectional vector seismic data processing method and apparatus, a computer readable storage medium and a device, applied to an omnidirectional vector geophone. Wherein the method comprises: collecting omnidirectional vector seismic data of the omnidirectional vector geophone, and performing a pre-processing operation on the omnidirectional vector seismic data; performing pressure and shear waves separation operation on the omnidirectional vector seismic data after the data is subject to the pre-processing operation, to obtain pressure wave data and shear wave data; sequentially performing space vector calculation, a wave field recovery operation and an imaging
(Continued)

operation on the pressure wave data and the shear wave data, and then performing modeling to obtain a pressure wave velocity model and a shear wave velocity model. The invention solves the problem of the existing seismic exploration technology that cannot measure and process divergence data and curl data of seismic wave field, so as to improve construction, lithology, fluid exploration accuracy and reliability and promote seismic exploration to be developed from structural exploration to lithology exploration and fluid exploration.

21 Claims, 8 Drawing Sheets

(51) Int. Cl.
  *G01V 1/30* (2006.01)
  *G01V 1/00* (2006.01)
(52) U.S. Cl.
  CPC .............. *G01V 1/305* (2013.01); *G01V 1/008* (2013.01); *G01V 2200/14* (2013.01); *G01V 2210/512* (2013.01); *G01V 2210/67* (2013.01)
(58) Field of Classification Search
  CPC ........ G01V 1/184; G01V 1/305; G01V 1/008; G01V 2210/67; G01V 2200/14; G01V 2210/512
  See application file for complete search history.

(56) References Cited

U.S. PATENT DOCUMENTS

| | | | |
|---|---|---|---|
| 5,889,731 | A | 3/1999 | Laurent |
| 6,291,901 | B1 | 9/2001 | Cefo |
| 2005/0090987 | A1 | 4/2005 | Amundsen et al. |
| 2010/0116059 | A1 | 5/2010 | Gan et al. |
| 2010/0195439 | A1 | 8/2010 | Muyzert |
| 2011/0063946 | A1 | 3/2011 | Muyzert et al. |
| 2014/0219053 | A1 | 8/2014 | Goujon et al. |
| 2018/0246237 | A1 | 8/2018 | Chen |
| 2018/0267184 | A1 | 9/2018 | Chen |

FOREIGN PATENT DOCUMENTS

| | | | |
|---|---|---|---|
| CN | 1460867 | A | 12/2003 |
| CN | 1908674 | A | 2/2007 |
| CN | 101002088 | A | 7/2007 |
| CN | 201043915 | Y | 4/2008 |
| CN | 101893720 | A | 11/2010 |
| CN | 102023309 | A | 4/2011 |
| CN | 102053261 | A | 5/2011 |
| CN | 102095893 | A | 6/2011 |
| CN | 201852944 | U | 6/2011 |
| CN | 102341728 | A | 2/2012 |
| CN | 102692646 | A | 9/2012 |
| CN | 103048683 | A | 4/2013 |
| CN | 103513273 | A | 1/2014 |
| CN | 103645497 | A | 3/2014 |
| CN | 103675350 | A | 3/2014 |
| CN | 104237934 | A | 12/2014 |
| CN | 104808242 | A | 7/2015 |
| CN | 105259566 | A | 1/2016 |
| CN | 105388514 | A | 3/2016 |
| CN | 105467440 | A | 4/2016 |
| DE | 266183 | A1 | 3/1989 |
| GB | 2358469 | A | 7/2001 |
| JP | 6313729 | A | 11/1994 |
| JP | 2006-10520 | A | 1/2006 |
| WO | 2002/068996 | A1 | 9/2002 |
| WO | 2006/043046 | A1 | 4/2006 |
| WO | 2011032080 | A2 | 3/2011 |
| WO | 2012027160 | A1 | 3/2012 |
| WO | 2013092747 | A1 | 6/2013 |

OTHER PUBLICATIONS

Robertsson, et al., "Wavefield separation using a volume distribution of three component recordings," Geophysical Research Letters, vol. 26, No. 18, pp. 2821-2824, Sep. 15, 1999.
Curtis, A., et al., "Wavefield separation and estimation of near surface velocities in land seismic," 62nd EAGE Conference & Exhibition, May 29, 2000.
Toda, R., et al., "Electrostatically Levitated Spherical 3-Axis Accelerometer," IEEE, 2012.
Gui-Ian et al., "The Design of Three-component ALL-fiberoptic Acceleration Seismometer," Journal of Optoelectronics Laser vol. 13 No. Jan. 1, 2002.
J. Robertsson and A. Curtis, "Wavefield separation using densely deployed three-component single-sensor groups in land surface-seismic recordings," Geophysics vol. 67, No. 5, 1624-1633 Sep./Oct. 2002.
M. B.Dobrin, "Detector," An overview of geophysical exploration, 62-65 1993.
Bangliu et al., "Technical Theory and Practice for Multi-component Seismic Exploration," Theory and practice of multi component seismic exploration technology, 77-78 2007.
H. Lixin, "Detector Coupling Theories and Experiments," Theory and experiment of geophone coupling, 2009.
Peng'an, Q., "Analysis of the Study on Monolithic Multi-Dimensional Accelerometers," Chinese Journal of Scientific Instrument, vol. 28; No. 8; 39-42 (2007).
Chinese Search Report for Chinese Application No. 201510716250X, entitled: "Omni-Directional Vector Seismic Data Processing Method and Apparatus, and Computer-Readable Storage Medium and Device," dated May 22, 2017.
International Search Report for International Application No. PCT/CN2016/099825, entitled: "Omni-Directional Vector Seismic Data Processing Method and Apparatus, and Computer-Readable Storage Medium and Device," dated Nov. 30, 2016.
Keyang, C. et al., "High-order high-density 3D multi-wave multi-component elastic wave field separating forward numerical simulation," Reservoir Evaluation and Development, vol. 3; No. 2; 6-13 (2013).
Li, C., "Development on multi-wave and multi-component seismic exploration technology," Resource Environment and Energy Saving & Disaster Reduction, vol. 7; 125-126 (2013).
Qifeng, S. and Qizhen, D., "A review of the multi-component seismic data processing," Petroleum Exploration and Development, vol. 38; No. 1; 67-71 (2011).
Zhi-Yuan, L. et al., "Improved method of separating P-and S-waves using divergence and curl," Chinese Journal of Geophysics, vol. 56; No. 6; 2012-2021 (2013).

OMNIDIRECTIONAL VECTOR SEISMIC DATA PROCESSING METHOD AND APPARATUS, COMPUTER-READABLE STORAGE MEDIUM AND DEVICE

RELATED APPLICATIONS

This application is a continuation of International Application No. PCT/CN2016/099825, filed Sep. 23, 2016, which designates the U.S., published in Chinese, and claims priority under 35 U.S.C. § 119 or 365(c) to Chinese Application No. 201510716250.X, filed on Oct. 28, 2015. The entire teachings of the above applications are incorporated herein by reference.

TECHNICAL FIELD

The invention relates to the technical field of seismic exploration, in particular to an omnidirectional vector seismic data processing method and apparatus, a computer-readable storage medium and device.

BACKGROUND OF THE INVENTION

According to wave theory, wave means not only vibration but also propagation of the vibration. To be specific, 1. vibration can be decomposed into translational vibration, rotational vibration; 2. wave field divergence drives pressure wave, and wave field curl drives shear wave; 3. translational vibration is a combined action of divergence and curl, including not only pressure wave but also shear wave; 4. rotational vibration is related only to curl; 5. volume curl is complete curl, and surface curl is incomplete curl. Accordingly, a technology that can only detect translational vibration cannot completely separate pressure wave from shear wave. Only a technology that can detect volume curl or divergence can work out pure shear wave and pure pressure wave.

Spatial motion properties of wave include abundant information, which play important roles in aspects such as wave field separation, signal-to-noise ratio, fidelity, imaging precision, medium attribute analysis, or the like. However, an existing acquisition technology can only detect information such as amplitude, frequency, phase or the like, and could not detect the spatial properties of wave motions.

Currently, detection of seismic wave is realized by converting wave vibration into an electric signal (voltage, current) or then converting the electric signal into a digital signal. A method of converting mechanical motion into an electric signal applies nothing more than an electromagnetic detector, a capacitance detector, a piezoelectric detector and a fiber optic strain detector.

The electromagnetic detector and the capacitance detector are of line-vibration type and have working direction. Ideal direction filtering effect is cos θ, out(t)=A(t)cos θ. A(t) and θ are both unknown, only a single device cannot work out the true amplitude A(t) and the angle θ. An MEMS detector basically belongs to a capacitance detector, which also follows the above rule.

The fiber optic strain detector may be line-vibration or pressure-intensity type, and only a single device cannot determine vibration direction either. Accordingly, a single electromagnetic detector, a single capacitance detector or a single fiber optic strain detector cannot distinguish wave field vibration direction, even not having the function of detecting wave field divergence or curl.

The piezoelectric detector is of pressure-intensity type, and the output is related to pressure intensity of surrounding liquid medium, which is non-directional and cannot distinguish vibration direction. Pressure intensity in a liquid environment is isotropic and is equivalent to wave field divergence. But in a terrestrial solid environment, even if the detector is put in a liquid container, the detector still fails to realize divergence measurement.

A three component detector can work out wave field vibration direction θ and amplitude A(t) by a three-vector combination method. This is also the reason why the three component detector is called a vector detector, but it only measure translational vibration vector of a point, cannot detect nature, curl and divergence of vibration.

From the above, the existing seismic exploration technology cannot measure divergence and complete curl of seismic wave field, cannot solve problems of wave field vibration direction, propagation direction, true amplitude and separation of pressure and shear waves, thereby causing the existing seismic exploration technology cannot completely meet the resource exploration demand in aspects of formation imaging, formation lithology and fluid detection accuracy, embodied specifically in the following two aspects:

1) Restriction on Research and Analysis of Seismic Wave Property

Due to insufficient collection of information on seismic wave field, pressure wave and shear wave cannot be discomposed, such that demarcation between usable information and interference information is obscure. Analysis on an interference source is based on hypothesis and numerous tests, but the effect is unsatisfactory. For example, collection processing methods of improving fidelity on land and improving signal-to-noise ratio on mountain land are mutually restrictive, noise suppression effect needs to be further improved.

2) Restriction on Further Study on Wave Theory, Especially on Full-Elasticity Theory Application of an elastic wave theory, through research, data collection, experiments and application of fully elastic wave equation, can obtain dielectric elastic parameters, accurately determine properties of the medium and spatial distribution state thereof, so as to improve lithology and fluid recognition accuracy. By spatial motion properties of seismic wave, e.g., media elastic parameters such as vibration property, divergence, curl etc., research on elastic wave is developed, which is technology developing direction for improving resource exploration accuracy. But, the existing seismic exploration technology cannot accurately measure divergence data and curl data of seismic wave field, thereby restricting the wave theory, especially further research on full-elasticity theory.

By the existing traditional seismic exploration technology, amplitude and arrival time of seismic wave field that are projected in vertical direction are recorded in the wild by utilizing a wave detector that vibrates vertically, which is called pressure wave exploration. In some circumstances, amplitude and arrival time of seismic wave field that are projected in horizontal direction are recorded by utilizing a wave detector that is placed horizontally, which is called converted wave exploration, and also called shear wave exploration. Such observation method has defects such as impure pressure wave and shear wave etc. The observed pressure wave and shear wave are separately and jointly subject to imaging process, and the pressure and shear waves are separately and jointly subject to attribute pickup, analysis and inversion. Because pressure and shear waves are mingled in the record of the observed seismic wave and are of mutual interference, signal-to-noise ratio of land pressure wave is low, shear wave cannot be recognized easily, seismic imaging accuracy is somewhat affected, lithology prediction and fluid prediction are of multiplicity of solutions.

For the above problem, there has not yet come up with an effective solution.

SUMMARY OF THE INVENTION

The invention provides an omnidirectional vector seismic data processing method and apparatus, a computer-readable storage medium and device, to at least solve the problem of the existing seismic exploration technology that cannot measure and process divergence data and curl data of seismic wave field.

Based on an aspect of the invention, there is provided with an omnidirectional vector seismic data processing method applied to an omnidirectional vector geophone, wherein the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface;

the method comprising:

collecting omnidirectional vector seismic data from the omnidirectional vector geophone, and performing a pre-processing operation on the omnidirectional vector seismic data; performing pressure and shear waves separation operation on the omnidirectional vector seismic data after the data is subject to the pre-processing operation, to obtain pressure wave data and shear wave data; performing space vector calculation and wave field recovery operation on the pressure wave data and the shear wave data, wherein the wave field recovery operation includes a statics correction and a deconvolution operation; performing an imaging operation based on the pressure wave data and the shear wave that are subject to the wave field recovery operation, to obtain pressure wave imaging data and shear wave imaging data; performing modeling based on the pressure wave data and the shear wave data that are subject to the wave field recovery operation and the pressure wave imaging data and the shear wave imaging data, to obtain a pressure wave velocity model and a shear wave velocity model.

Based on an aspect of the invention, there is provided with a computer-readable storage medium including computer-readable instructions, applied to an omnidirectional vector geophone, the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface; wherein, when being executed, the computer-readable instructions cause a processor to execute at least the following operations:

collecting omnidirectional vector seismic data of the omnidirectional vector geophone, and performing a pre-processing operation on the omnidirectional vector seismic data;

performing pressure and shear waves separation operation on the omnidirectional vector seismic data after the data is subject to the pre-processing operation, to obtain pressure wave data and shear wave data;

performing space vector calculation and wave field recovery operation on the pressure wave data and the shear wave data, wherein the wave field recovery operation includes a statics correction and a deconvolution operation;

performing an imaging operation based on the pressure wave data and the shear wave that are subject to the wave field recovery operation, to obtain pressure wave imaging data and shear wave imaging data;

performing modeling based on the pressure wave data and the shear wave data that are subject to the wave field recovery operation and the pressure wave imaging data and the shear wave imaging data, to obtain a pressure wave velocity model and a shear wave velocity model.

Based on an aspect of the invention, there is provided with a device applied to an omnidirectional vector geophone, the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface; wherein the device comprises:

a processor; and a storage including computer-readable instructions, when being executed, the computer-readable instructions cause the processor to execute the following operations:

collecting omnidirectional vector seismic data of the omnidirectional vector geophone, and performing a pre-processing operation on the omnidirectional vector seismic data;

performing pressure and shear waves separation operation on the omnidirectional vector seismic data after the data is subject to the pre-processing operation, to obtain pressure wave data and shear wave data;

performing space vector calculation and wave field recovery operation on the pressure wave data and the shear wave data, wherein the wave field recovery operation includes a statics correction and a deconvolution operation;

performing an imaging operation based on the pressure wave data and the shear wave that are subject to the wave field recovery operation, to obtain pressure wave imaging data and shear wave imaging data;

performing modeling based on the pressure wave data and the shear wave data that are subject to the wave field recovery operation and the pressure wave imaging data and the shear wave imaging data, to obtain a pressure wave velocity model and a shear wave velocity model.

Based on an aspect of the invention, there is provided with an omnidirectional vector seismic data processing apparatus applied to an omnidirectional vector geophone, the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface;

the apparatus comprises:

a data collection module for collecting omnidirectional vector seismic data of the omnidirectional vector geophone;

a pre-processing module, for performing a pre-processing operation on the omnidirectional vector seismic data;

a pressure and shear wave separation module for performing pressure and shear waves separation operation on the omnidirectional vector seismic data after the data is subject to the pre-processing operation, to obtain pressure wave data and shear wave data;

a space vector calculation module for performing space vector calculation on the pressure wave data and the shear wave data;

a wave field recovery module for performing a wave field recovery operation on the pressure wave data and the shear wave data after they are subject to the space vector calculation, wherein the wave field recovery operation includes a statics correction and a deconvolution operation;

an imaging module for performing an imaging operation based on the pressure wave data and the shear wave that are subject to the wave field recovery operation, to obtain pressure wave imaging data and shear wave imaging data;

a modeling module for performing modeling based on the pressure wave data and the shear wave data that are subject to the wave field recovery operation and the pressure wave imaging data and the shear wave imaging data, to obtain a pressure wave velocity model and a shear wave velocity model.

The invention provides an omnidirectional vector seismic data processing method and apparatus, a computer-readable storage medium and device, on the basis that an omnidirectional vector geophone is applied for collecting omnidirectional vector seismic data, separation of divergence from curl of seismic wave is performed, by divergence and curl processing analysis, pure pressure wave information including no shear wave vibration signal (curl) and pure shear wave information including no expansion-contraction vibration signal (divergence) are finally formed, the pressure wave and the shear wave are separately subject to an imaging process and thus to joint inversion and explanation and other similar works, which solves the problem of the existing seismic exploration technology that cannot measure and process divergence data and curl data of seismic wave field, so as to improve construction, lithology, fluid exploration accuracy and reliability and promote seismic exploration to be developed from structural exploration to lithology exploration and fluid exploration.

BRIEF DESCRIPTION OF THE DRAWINGS

The drawings described here are used for providing further understanding to the present invention and constitute a part of the present application, and schematic embodiments of the invention and the description thereof are used for explaining the invention and do not constitute definition to the invention. In the drawings.

DETAILED DESCRIPTION OF THE EMBODIMENT

Figure 1:
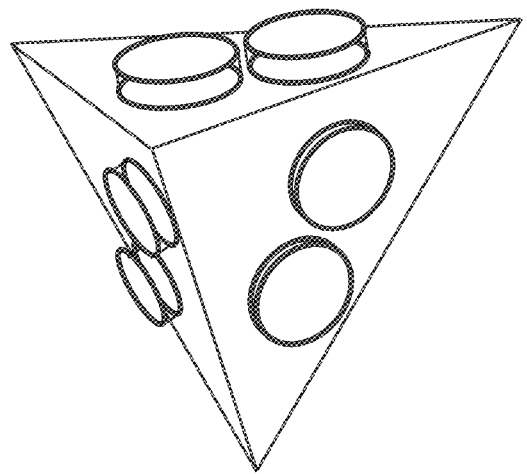
FIG. 1 is a structural schematic diagram of an omnidirectional vector geophone based on an embodiment of the invention.

Hereinafter the technical solution in the embodiments of the present invention will be described clearly and integrally in combination with the accompanying drawings in the embodiments of the present invention, and obviously the described embodiments are merely part of the embodiments, not all of the embodiments. Based on the embodiments of the present invention, all other embodiments that are obtained by persons skilled in the art without making creative efforts fall within the protection scope of the present invention.

Seismic wave detection flow in traditional technology is as below:

Based on a wave equation, medium mass points satisfy the following movement relationship as in equation (1):

$$\rho \frac{\partial^2 \vec{U}}{\partial t^2} = (\lambda + \mu) grad\theta + \mu \nabla^2 \vec{U} + \rho \vec{F} \quad (1)$$

wherein, $\lambda$, $\mu$ denote Lamé constants, $\rho$ denotes density, U denotes displacement vector, and t denotes time.

$\vec{F}$ denotes an external force vector, $\vec{F} = f_x \vec{i} + f_y \vec{j} + f_z \vec{k}$.

$\nabla^2$ denotes Laplace operator, $$\nabla^2 = \frac{\partial^2}{\partial x^2} + \frac{\partial^2}{\partial y^2} + \frac{\partial^2}{\partial z^2}.$$

θ denotes a volumetric coefficient, $$\theta = div\vec{U} = \frac{\partial u}{\partial x} + \frac{\partial v}{\partial y} + \frac{\partial w}{\partial z}.$$

Solving divergence from the equation (1), to obtain the following equation (2):

$$\frac{\partial^2 \theta}{\partial t^2} - V_p^2 \nabla^2 \theta = \frac{\partial^2 \theta}{\partial t^2} - \frac{\lambda + 2\mu}{\rho} = \nabla^2 \theta = div\vec{F} \quad (2)$$

wherein, div denote divergence, and $V_p$ denotes pressure wave propagation velocity.

Solving curl from the equation (1), to obtain the following equation (3):

$$\frac{\partial^2 \vec{w}}{\partial t^2} - V_s^2 \nabla^2 \vec{w} = \frac{\partial^2 \vec{w}}{\partial t^2} - \frac{\mu}{\rho} = \nabla^2 \vec{w} = rot\vec{F} \quad (3)$$

wherein, rot denotes curl. w=rot(U), $V_s$ denotes pressure wave propagation velocity.

In traditional technology, detection of seismic wave merely refers to acquired of a projection of $\vec{U}(t, x, y, z)$ on a vertical working direction of the wave detector, but not $\vec{U}$. Then various equations are derived according to the equation (2) to obtain the pressure wave; a projection of $\vec{U}(t, x, y, z)$ in horizontal working direction of the detector is collected, then various equations are derived according to the equation (3) to obtain the shear wave. Joint solving and joint inversion are performed on the basis of these errors. Accordingly, the final data processing result has certain errors.

The technical solution of the invention is to collect by using an omnidirectional vector geophone, curl of vibration of mass points, i.e., response of rot $\vec{F}$ at the collected points, and to collect a linear vibration vector, i.e., response of $\vec{U}(t, x, y, z)$ at the collected points, next divergence is solved, i.e., response of div $\vec{F}$ at the collected points. The above content is core of the technical solution of the invention. Hereinafter structure of the omnidirectional vector geophone is introduced firstly, then the technical solution of processing omnidirectional vector seismic data based on the omnidirectional vector geophone of the invention will be introduced by combining embodiments.

Embodiment 1

The invention provides an omnidirectional vector geophone, which is omnidirectionally evenly balanced in terms of spatial structure, this is a structural advantage that none of wave detectors in the prior art possesses, and accurate detection of full information of seismic wave field can be realized by the structural advantage.

FIG. 1 is a structural schematic diagram of an omnidirectional vector geophone based on an embodiment of the invention, as shown in FIG. 1, the omnidirectional vector geophone, the omnidirectional vector geophone comprises: eight wave detectors and support structures thereof, the eight wave detectors are divided into four groups each including two wave detectors, the support structures are used for supporting the eight wave detectors such that bottom surfaces of two wave detectors of each group are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface.

It is necessary to explain that the above working shafts are virtual shafts for describing positional relationship. In practical application, a working shaft of a wave detector is not necessarily in a central position of the wave detector (i.e., a center shaft). The above-described regular tetrahedron is not a solid structure but a virtual spatial structure, aiming to describe positional relationship between the eight wave detectors.

In the embodiment, based on divergence and curl equations of field theory, a particular spatial motion full-vector detection structure is designed to realize detection of full information including frequency, amplitude, phase, vibration direction of the seismic wave field, especially divergence and curl of a wave force field, to form a brand-new omnidirectional vector geophone technology.

A support structure of the omnidirectional vector geophone can be designed into any shape as demanded, which is not limited in the invention as long as space vector form can be ensured. Preferably, the omnidirectional vector geophone can be designed into shape of a regular tetrahedron, size of a support structure of which is generally larger than that of the above virtual regular tetrahedron. preferably, each surface of the support structure of the regular tetrahedron can be changed into any curved surface so as to satisfy different demands. Material of the support structure is not limited to be solid, rigidity of the support structure is related to the measured result, so that different materials can be selected as demanded.

In the embodiment, there are two wave detectors on each regular triangular surface of the regular tetrahedron, and normal operation of the omnidirectional vector geophone can be ensured only when putting positions of these two wave detectors on the regular triangular surface meet certain requirements. There are at least two ways of placing the two wave detectors on each regular triangular surface, which will be introduced respectively below.

Figure 2:
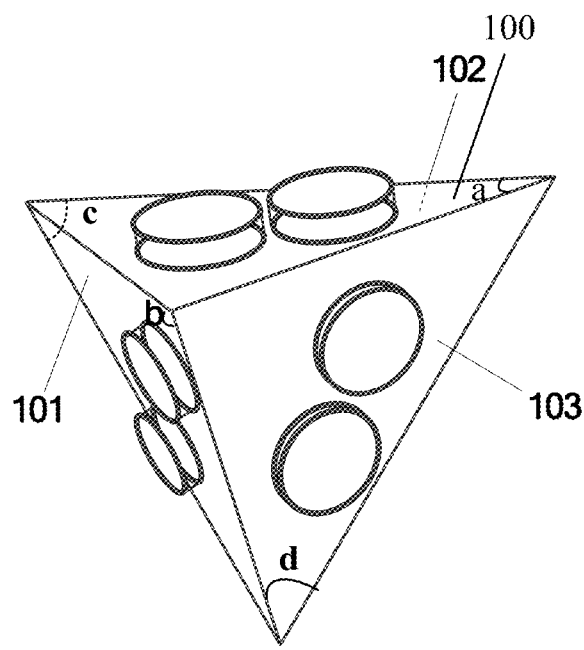
FIG. 2 is a first kind of structural schematic diagram of an omnidirectional vector geophone based on an embodiment of the invention.

1) FIG. 2 is a first kind of structural schematic diagram of an omnidirectional vector geophone based on an embodiment of the invention, FIG. 2 makes introduction taking an example that the support structure is of shape of a regular tetrahedron, as shown in FIG. 2, letting one of regular triangular surfaces of the regular tetrahedron to be a main triangular surface 100 whose one angle is defined as a first vertex angle a of the regular tetrahedron, crossing points of working shafts of two wave detectors on the main triangular surface 100 that cross with the main triangular surface 100 are both on an angular bisector of the first vertex angle a.

The other surface of the regular tetrahedron where a base opposite to the first vertex angle as is defined as a first side surface 101 of the regular tetrahedron, a midpoint of the base slides along an anticlockwise direction on the main triangular surface 100 to meet an angle on the first side surface 101 that is defined as a second vertex angle b, crossing points of working shafts of two wave detectors on the first side surface 101 that cross with the first side surface 101 are both on an angular bisector of the second vertex angle b.

It is necessary to explain that, the above-described anticlockwise direction is an anticlockwise direction when the main triangular surface 100 is placed horizontally upwards and a person faces the first side surface 101, and an anticlockwise direction and a clockwise direction mentioned below both adopt this method.

The other surface of the regular tetrahedron where a base opposite to the second vertex angle b as is defined as a second side surface 102 of the regular tetrahedron, a midpoint of the base slides along a clockwise direction on the first side surface 101 to meet an angle on the second side surface 102 that is defined as a third vertex angle c, crossing points of working shafts of two wave detectors on the second side surface 102 that cross with the second side surface 102 are both on an angular bisector of the third vertex angle c.

The other surface of the regular tetrahedron where a base opposite to the third vertex angle c as is defined as a third side surface 103 of the regular tetrahedron, a midpoint of the base slides along an anticlockwise direction on the second side surface 102 to meet an angle on the third side surface 103 that is defined as a fourth vertex angle d, crossing points of working shafts of two wave detectors on the third side surface 103 that cross with the third side surface 103 are both on an angular bisector of the fourth vertex angle d.

Figure 3:
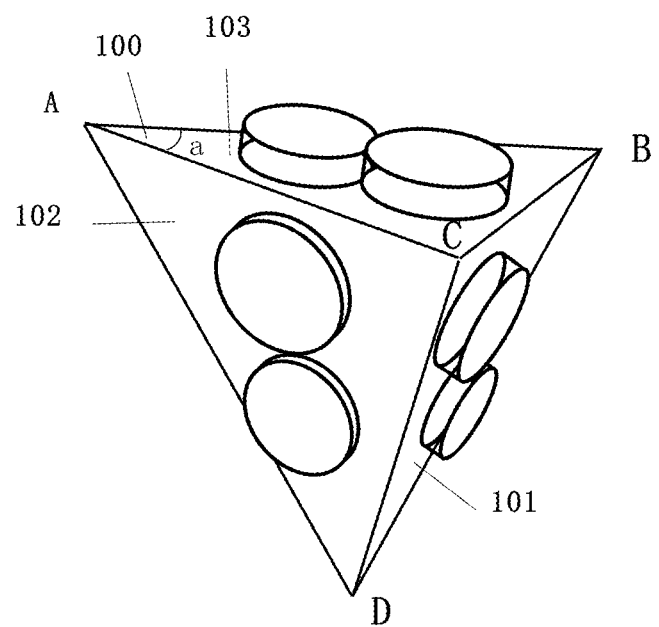
FIG. 3 is a second kind of structural schematic diagram of an omnidirectional vector geophone based on an embodiment of the invention.

2) FIG. 3 is a second kind of structural schematic diagram of an omnidirectional vector geophone based on an embodiment of the invention, FIG. 3 makes introduction taking an example that the support structure is of shape of a regular tetrahedron, as shown in FIG. 3, the above-described first vertex angle a, second vertex angle b, third vertex angle c and fourth vertex angle d correspond respectively to a first vertex A, a second vertex B, a third vertex C and a fourth vertex D of the regular tetrahedron.

Crossing points of working shafts of two wave detectors on the main triangular surface 100 that cross with the main triangular surface 100 are both on an angular bisector of the first vertex angle a;

crossing points of working shafts of two wave detectors on the first side surface 101 that cross with the first side surface 101 are both on an angular bisector of an angle of the third vertex C on the first side surface 101;

crossing points of working shafts of two wave detectors on the second side surface 102 that cross with the second side surface 102 are both on an angular bisector of an angle of the fourth vertex D on the second side surface 102;

crossing points of working shafts of two wave detectors on the third side surface 103 that cross with the third side surface 103 are both on an angular bisector of an angle of the second vertex D on the third side surface 103.

The above-described two ways of placing can also be realized by the following methods:

1) Four regular triangular surfaces of the regular tetrahedron are respectively provided with a unique straight line that connects an angle, a surface geometric center and a midpoint of an opposite edge (i.e., the corresponding base). The regular tetrahedron is disposed with one surface facing upwards (i.e., the above-described main triangular surface), a connection line of a tetrahedron geometric center and a geometric center of this surface is vertically upward and defined as a vertical shaft (also called a main shaft) of the omnidirectional vector geophone, and is also a first line vector axis, direction of the above-described straight line that is disposed on the surface facing upwards is defined as a from-north (also called a first direction) of the omnidirectional vector geophone. The angle on the first side surface that is met when sliding anticlockwise along an arris (i.e., a bottom edge) that vertically crosses the from-north points to a midpoint of an opposite arris in a direction which is defined as a second direction, and the angle on the second side surface that is met when sliding clockwise along an arris that vertically crosses the second direction points to a midpoint of an opposite arris in a direction which is defined as a third direction, and the angle on the third side surface that is met when sliding anticlockwise along an arris that vertically crosses the third direction points to a midpoint of an opposite arris in a direction which is defined as a fourth direction.

On each of directional lines along the above-described four directions, a high-sensitivity wide band full tilt detector whose working direction is vertical to the regular triangular surface is installed by moving from a center of each regular triangular surface to the angle and the arris by a (wherein, $0<a<\lambda/4$, $\lambda$ is wavelength).

2) On the above-described surface disposed to face upwards, the angle that is met when sliding clockwise along an arris that vertically crosses the above-described from-north points to a midpoint of an opposite arris in a direction which is defined as a fifth direction, and the angle that is met when sliding anticlockwise along an arris that vertically crosses the fifth direction points to a midpoint of an opposite arris in a direction which is defined as a sixth direction, and the angle that is met when sliding clockwise along an arris that vertically crosses the sixth direction points to a midpoint of an opposite arris in a direction which is defined as a seventh direction.

On each of directional lines along the above-described four directions, a high-sensitivity wide band full tilt detector whose working direction is vertical to the regular triangular surface is installed by moving from a center of each regular triangular surface to the angle and the arris by a (wherein, $0<a<\lambda/4$, $\lambda$ is wavelength).

The wave detector in the embodiment can at least be a cylindrical electromagnetic type wave detector, which needs to satisfy: a distance from a bottom surface of each cylindrical electromagnetic type wave detector to a tetrahedron geometric center of the regular tetrahedron is a minimum value by which the wave detectors do not contact with each other; or may be a flat sheet capacitor type wave detector. Of course, the wave detector may also be other types of wave detectors as long as it can operate normally in the omnidirectional vector geophone, and this is not limited in the invention.

Figure 4:
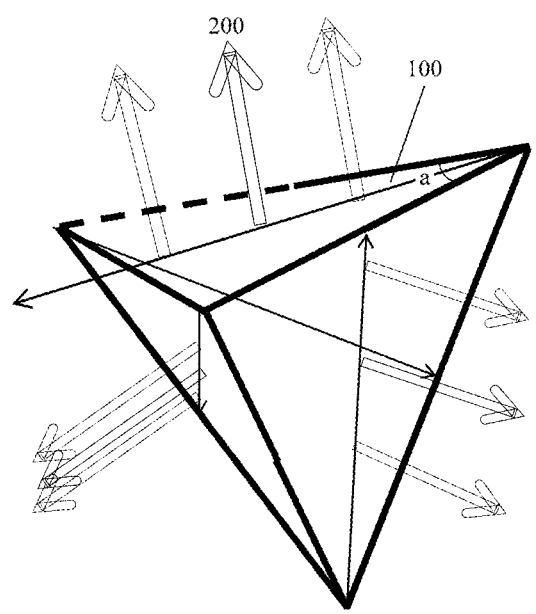
FIG. 4 is a schematic diagram of work vector of a first kind of structure of an omnidirectional vector geophone based on an embodiment of the invention.
Figure 5:
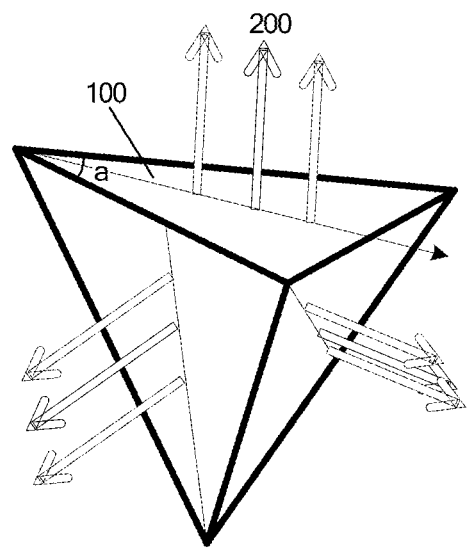
FIG. 5 is a schematic diagram of work vector of a second kind of structure of an omnidirectional vector geophone based on an embodiment of the invention.

FIG. 4 is a schematic diagram of work vector of a first kind of structure of an omnidirectional vector geophone based on an embodiment of the invention, FIG. 5 is a schematic diagram of work vector of a second kind of structure of an omnidirectional vector geophone based on an embodiment of the invention. The arrow on each surface in FIGS. 4 and 5 indicates a working vector, a center shaft vertical to the main triangular surface 100 is disposed to be a main shaft 200, an angular bisector of the first vertex angle a on the main triangular surface 100 is in a direction which is defined as a from-north.

Figure 6:
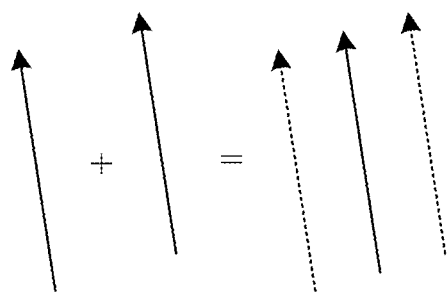
FIG. 6 is a schematic diagram of parallel vectors based on an embodiment of the invention.

FIG. 6 is a schematic diagram of parallel vectors based on an embodiment of the invention. As shown in FIG. 6, in a smooth continuous wave field, the distance is far less than a sum of dot products of two parallel vectors of the wavelength with the wave field that is divided by 2, and is equal to a dot product of a vector at a middle position with the wave field.

Figure 7:
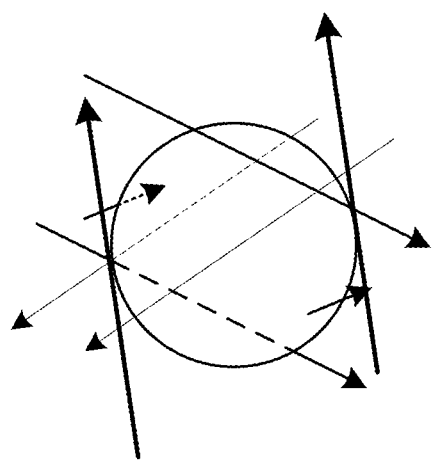
FIG. 7 is a space vector relationship diagram of an omnidirectional vector geophone based on an embodiment of the invention.

FIG. 7 is a space vector relationship diagram of an omnidirectional vector geophone based on an embodiment of the invention. As shown in FIG. 7, the individual arrows indicate a working vector on each surface. The circle in FIG. 7 indicates an inner tangent sphere that is enclosed by eight space vectors of the omnidirectional vector geophone.

Figure 8:
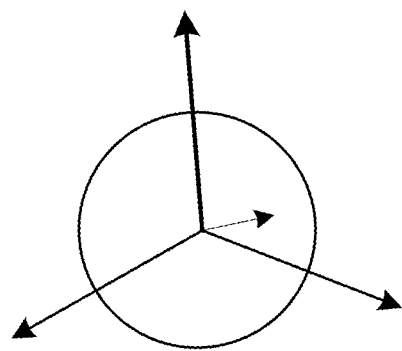
FIG. 8 is a structural schematic diagram of total integral equivalent Gaussian divergence based on an embodiment of the invention.
Figure 9:
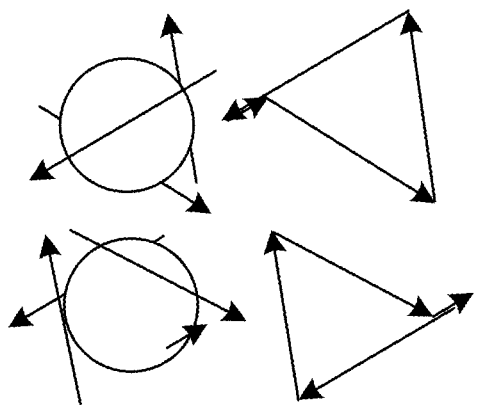
FIG. 9 is a structural schematic diagram of stokes' integral positive and negative curl equivalence based on an embodiment of the invention.

FIG. 8 is a structural schematic diagram of total integral equivalent Gaussian divergence based on an embodiment of the invention, FIG. 9 is a structural schematic diagram of stokes' integral positive and negative curl equivalence based on an embodiment of the invention. It can be seen from the vector relationship as shown in FIGS. 8 and 9 that:

Based on Divergence Gaussian theorem:

$$\int\int\int_V div A dv = \iint_S A \cdot n dS,$$

a divergence formula of the omnidirectional vector geophone in the embodiment of the invention can be obtained:

$$\int\int\int_V div A dv = \iint_S A \cdot n dS = \frac{1}{m}\sum_{i=1}^{m} A \cdot n_i.$$

Based on Curl Stokes' formula:

$$\int\int_s rot A \cdot dS = \int\int_s rot A \cdot n dS = \oint A \cdot dl,$$

a positive curl formula of the embodiment can be obtained as:

$$\int\int_S rot A dS = \oint A \cdot dl = \frac{1}{m}\sum_{i=1}^{m} A \cdot \vec{l}_i,$$

as well as an anti-curl formula:

$$-\int\int_S rot A dS = \oint A \cdot dl = \frac{1}{m}\sum_{i=m+1}^{2m} A \cdot \vec{l}_i.$$

Wherein, A is a wave field function, l is a detector response vector, i is an inner trace serial number of the detector, trace(i)=A·$\vec{l}_i$ is the collected internal trace data of the ith trace, on the above-described total integral equivalent Gaussian divergence structure: $\vec{l}_i$ is a first group, i=1-4, $\vec{l}_{i\ i}$ is a third group, i=5-8. div indicates divergence, rot indicates curl, V indicates volume, dv indicates differential volume, S indicates area, dS indicates differential of area, m indicates the number of a regular m-hedron; $n_i$ indicates a wave response vector on a normal of the ith surface. Based on the trigonometric and differential product formulas, on the specific structure, $\vec{l}_i + \overrightarrow{l_{m+i}} = \vec{l}_i + \vec{l}_{i\ i} = 2n_i$.

It is necessary to explain that, the omnidirectional vector geophone provided by the invention is based on a four-equational stereo-space equilibrium structure that is formed by four shafts of a virtual regular tetrahedron (i.e., a stereo star-shaped shaft formed by connection lines of a tetrahedron center of the regular tetrahedron and centers of four regular triangular surfaces). A distance from a bottom surface of each wave detector to the tetrahedron center is denoted as d, and d is a minimum value by which the units and devices do not contact with each other, two high-sensitivity wide band full tilt detectors are installed on each regular triangular surface of the regular tetrahedron to be parallel to the shaft, and its amplitude response has a relationship with a working shaft thereof and an angle θ between wave field normals as below: out(t)=A(t)cos θ, wherein A(t) denotes response of the detector to the wave field when θ=0.

In the omnidirectional vector geophone, detectors on each regular triangular surface that are close to the corners are the first group, detectors that are close to the arris (i.e., opposite edge) are the second group, the first or second group of detectors spatially form a closed loop that conforms to the Curl Stokes' formula. The first group of output is positive curl, and the second group of output is negative curl.

An arithmetic sum of two wave detectors on the same regular triangular surface is equivalent to a wave detector at the center of each regular triangular surface in the case that a is smaller than λ/4, four measurement vectors that point to the tetrahedron center of the regular tetrahedron are formed, which is completely consistent with the requirement of the Gaussian divergence formula.

In this embodiment, the stokes' curl structure and the Gaussian divergence structure are combined perfectly, thus a total vector seismic measurement spatial structure with curl combined with divergence is formed.

Figure 10:
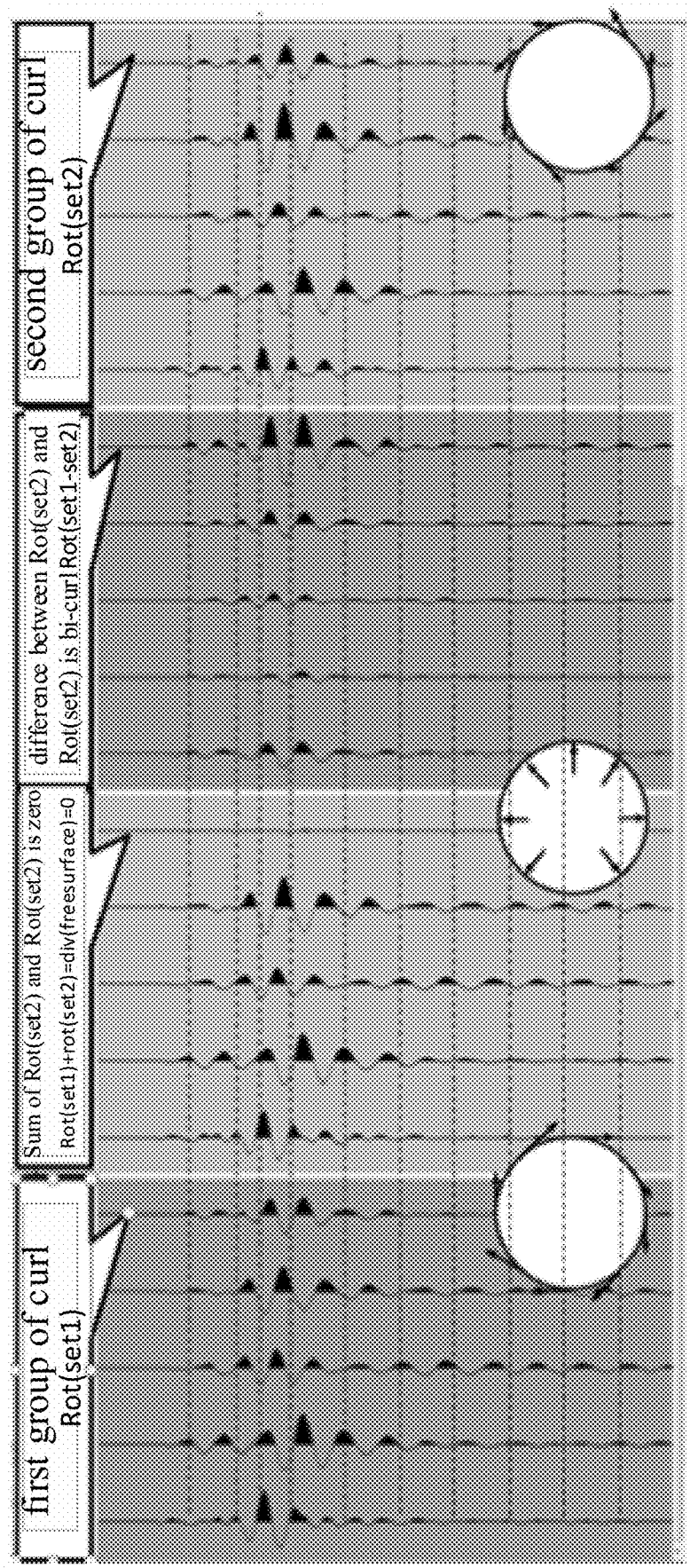
FIG. 10 is a schematic diagram of acutally measured output of an omnidirectional vector geophone based on an embodiment of the invention.

The omnidirectional vector geophone includes eight wave detectors, the first and second groups of wave detectors output totally eight tracks of data. FIG. 10 is a schematic diagram of acutally measured output of an omnidirectional vector geophone based on an embodiment of the invention. As shown in FIG. 10, four output results of the above first circuit correspond to a first group of curl as shown in FIG. 10, and four output results of the above second circuit correspond to a second group of curl as shown in FIG. 10. Sum of the first group of curl and the second group of curl is zero, and difference between the first group of curl and the second group of curl is bi-curl. Vector direction of the omnidirectional vector geophone is determined by One-spin-to-Two right-hand rule, a total curl vector direction can be calculated by vector operation. A vibration line vector can be obtained by calculating redundant vectors, and is equal to a vibration line vector calculated by a traditional three-component wave detector. By applying the method of solving a shear wave vibration line vector by curl, a pure shear wave line vector can be solved, and a pure pressure wave vibration line vector can be obtained by reducing the pure shear wave line vector from total vibration line vector.

Specific structure of the omnidirectional vector geophone has been described in detail in the above, in practical application process, in order to facilitate placement, a conical tail cone is connected on a support structure of the omnidirectional vector geophone, an extension line of an axis of the conical tail cone passes through one vertex of the regular tetrahedron and vertically penetrates through the center of one of the surfaces of the regular tetrahedron. In normal use process, the conical tail cone is vertically inserted downwards into the ground, so as to be fixed.

Figure 11:
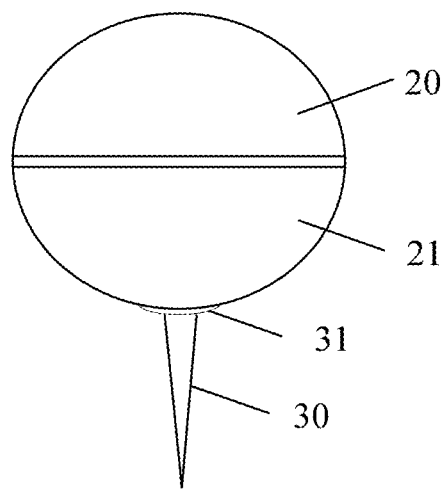
FIG. 11 is a schematic diagram of spherical shell appearance of an omnidirectional vector geophone based on an embodiment of the invention.

The omnidirectional vector geophone can also be provided with a spherical shell which is divided into an upper-half spherical shell and a lower-half spherical shell. Eight wave detectors and the support structure are placed inside the spherical shell, the lower-half spherical shell is provided with a tail cone hole at the bottom, and the above tail cone passes through the tail cone hole of the lower-half spherical shell. FIG. 11 is a schematic diagram of spherical shell appearance of an omnidirectional vector geophone based on an embodiment of the invention. As shown in FIG. 11, the spherical shell of the omnidirectional vector geophone is divided into an upper-half spherical shell 20 and a lower-half spherical shell 21. A conical tail cone 30 connected on the support structure of the omnidirectional vector geophone passes through a tail cone hole 31 that is disposed at the bottom of the lower-half spherical shell 21. By the preferable embodiment, the wave detector can be protected to stabilize the omnidirectional vector geophone.

Figure 12:
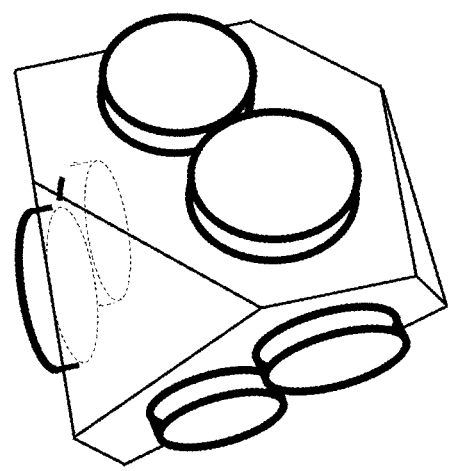
FIG. 12 is a schematic diagram of appearance of an omnidirectional vector geophone based on an embodiment of the invention.

In order to put the support structure and the eight wave detectors thereon of the omnidirectional vector geophone stably in the spherical shell, shape of the support structure can be designed into a shape that can be put into the spherical shell easily. FIG. 12 is a schematic diagram of appearance of an omnidirectional vector geophone based on an embodiment of the invention. As shown in FIG. 12, the vertexes of the support structure of regular tetrahedron shape are cut off by a piece such that the support structure can be easily placed in the spherical shell to ensure accuracy of the collected data of the omnidirectional vector geophone.

In consideration of fixation of the upper-half spherical shell and the lower-half spherical shell, the embodiment provides a preferable embodiment, namely: the upper-half spherical shell and the lower-half spherical shell are respectively provided on edges thereof with projections that are matched with each other, the projections of the upper-half spherical shell and the lower-half spherical shell are fixed by a fixing assembly, for example, being fixed by a screw and a screw hole. Thus stability of the omnidirectional vector geophone in practical operation process can be ensured.

For a signal output line of the omnidirectional vector geophone, a signal line hole can be provided on the spherical shell such that the signal output line of the wave detector passes through the signal line hole, so as to be convenient for the signal output line to be output to outside of the shell to effectively obtain the data.

In order to avoid water flooding into the omnidirectional vector geophone to effect use, waterproof may be sealed at the joint gap between the upper-half spherical shell and the lower-half spherical shell of the spherical shell, the tail cone hole and the signal line hole, for example, silica gel or rubber materials may be selected for sealing, so as to improve sealing performance of the omnidirectional vector geophone.

The omnidirectional vector geophone provided by the invention may be applied in the following aspects: land based artificial seismic exploration and natural seismic detection. The invention has the following application prospect: the omnidirectional vector geophone based on the invention can detect curl of seismic wave and can obtain vibration direction and real amplitude of the wave field, can decompose out pure pressure and shear waves, and thus can obtain abundant seismic wave information never seen before, thereby laying a new data base for exploration and research of earth science.

Divergence and curl features of the omnidirectional vector geophone are features of a wave detector with a rigid support structure that is placed on free surface of the earth's surface. When the wave detector is placed underground or inside a medium, these features are determined by a placement environment, material of the support structure of the wave detector and its contact relationship with the external world. These features can be designed depending on change of the specific application purpose. This will not be described in detail in the invention.

The structure and operating principle of the omnidirectional vector geophone are introduced in detail in the above, then the technical solution of processing omnidirectional vector seismic data based on the omnidirectional vector geophone will be introduced below.

Embodiment 2

Figure 13:
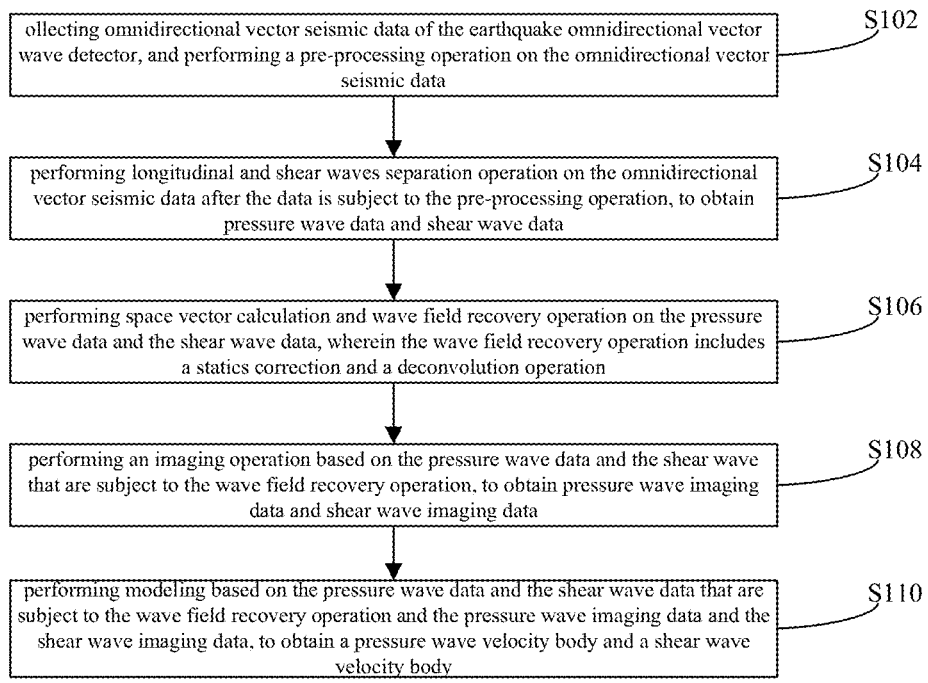
FIG. 13 is a flowchart of a processing method of omnidirectional vector seismic data based on an embodiment of the invention.

The embodiment provides an omnidirectional vector seismic data processing method applied to the above-described omnidirectional vector geophone. FIG. 13 is a flowchart of a processing method of omnidirectional vector seismic data based on an embodiment of the invention. As shown in FIG. 13, the process comprises the following steps (steps S102-steps S110):

a step S102: collecting omnidirectional vector seismic data of the omnidirectional vector geophone, and performing a pre-processing operation on the omnidirectional vector seismic data;

a step S104: performing pressure and shear waves separation operation on the omnidirectional vector seismic data after the data is subject to the pre-processing operation, to obtain pressure wave data and shear wave data;

a step S106: performing space vector calculation and wave field recovery operation on the pressure wave data and the shear wave data, wherein the wave field recovery operation includes a statics correction and a deconvolution operation;

a step S108: performing an imaging operation based on the pressure wave data and the shear wave that are subject to the wave field recovery operation, to obtain pressure wave imaging data and shear wave imaging data;

a step S110: performing modeling based on the pressure wave data and the shear wave data that are subject to the wave field recovery operation and the pressure wave imaging data and the shear wave imaging data, to obtain a pressure wave velocity model and a shear wave velocity model.

In the embodiment, on the basis that the omnidirectional vector seismic data is collected by the omnidirectional vector geophone, pressure wave data and shear wave data of the seismic wave are processed, which solves the problem of the existing seismic exploration technology that cannot measure and process divergence data and curl data of seismic wave field, so as to improve construction, lithology, fluid exploration accuracy and reliability and promote seismic exploration to be developed from structural exploration to lithology exploration and fluid exploration.

In one embodiment, in the step S102, a preprocessing operation on the omnidirectional vector seismic data is performed, specifically including: using an omnidirectional vector observation system to check whether the collected omnidirectional vector seismic data conforms to quality control condition or not; classifying and storing the omnidirectional vector seismic data that conforms to the quality control condition. Based on this, the quality control condition can be set as needed, so as to filtrate the omnidirectional vector seismic data to be beneficial to the subsequent data processing.

For example, the quality control condition can be that: among two wave detectors on each surface of the regular tetrahedron, wave detectors close to the corner corresponding to the angular bisector on which the detectors are classified as the first group, and wave detectors far from the corner corresponding to the angular bisector on which the detectors are classified as the second group. Letting inner trace serial numbers of four wave detectors of the first group respectively to be: 1, 2, 3, 4, and letting inner trace serial numbers of four wave detectors of the second group respectively to be: 5, 6, 7, 8. Based on the sequence of the inner trace serial numbers 1, 2, 3, 4, 5, 6, 7, 8, it is detected whether inner azimuthal angles of the wave detectors are in sequence: 0°, 0°, 120°, −120°, 0°, 0°, 120°, −120° or not; wherein, an inner azimuthal angle is an angle between the from-north and a natural arctic direction, the from-north is a direction of an angular bisector on which two wave detectors on a surface of the regular tetrahedron that faces horizontally upwards are. Based on the sequence of the inner trace serial numbers 1, 2, 3, 4, 5, 6, 7, 8, it is detected whether inner dip angles of the wave detectors are in sequence: 90°, −30°, −30°, −30°, 90°, −30°, −30°, −30°; wherein, an inner dip angle is an angle between a plane where the wave detector is and a natural horizontal plane.

In one embodiment, in the step S104, performing pressure and shear waves separation operation on the omnidirectional vector seismic data after the data is subject to the pre-processing operation, to obtain pressure wave data and shear wave data, specifically including: obtaining a total translational vibration amount based on the omnidirectional vector wave detector that conforms to the quality control condition; obtaining a shear wave translational vibration component based on the curl data of the omnidirectional vector geophone, and obtaining shear wave data based on the shear wave translational vibration component; reducing the shear wave translational vibration component from the total translational vibration amount to obtain a pressure wave translational vibration component, and obtaining pressure wave data based on the pressure wave translational vibration component. Based on this, the pressure wave data and the shear wave data can be separated accurately, which solves the problem of the existing seismic exploration technology that cannot measure and process divergence data and curl data of seismic wave field.

In one embodiment, in the step S106, performing space vector calculation on the pressure wave data and the shear wave data, specifically including: in a vector direction, sorting and outputting pressure wave data in different directions based on the azimuthal angle and the dip angle; in the vector direction, sorting and outputting shear wave data in different directions based on the azimuthal angle and the dip angle; reducing ground shear wave data from the shear wave data in different directions to obtain effective shear wave data in different directions. Based on this, space vectors of the pressure wave data and the shear wave data are calculated, which provides basis for the subsequent wave field recovery operation.

In one embodiment, in the step S106, performing wave field recovery operation on the pressure wave data and the shear wave data, specifically including: based on the pressure wave data in different directions, directionally calculating pressure wave surface consistent statics and shear wave surface consistent deconvolution factor; based on the effective shear wave data in different directions, directionally calculating shear wave ground surface directional consistency static correction amount and shear wave ground surface directional consistency deconvolution factor; generating pressure wave data after the wave field recovery operation is performed, directionally based on pressure wave surface consistent statics and pressure wave surface consistent deconvolution factor; generating shear wave data after the wave field recovery operation is performed, directionally based on shear wave surface consistent statics and shear wave surface consistent deconvolution factor. Based on this, wave field recovery operation is performed on the pressure wave data and the shear wave data, which provides basis for the subsequent imaging operation.

In one embodiment, in the step S108, performing an imaging operation based on the pressure wave data and the shear wave that are subject to the wave field recovery operation, specifically including: forming a pressure wave imaging section plane or a pressure wave imaging three-dimensional body based on the pressure wave data after the wave field recovery operation is performed; forming a shear wave imaging section plane or a shear wave imaging three-dimensional body based on the shear wave data after the wave field recovery operation is performed. Based on this, data support is provided for the subsequent modeling.

In one embodiment, in the step S110, performing modeling based on the pressure wave data and the shear wave data that are subject to the wave field recovery operation and the pressure wave imaging data and the shear wave imaging data, to obtain a pressure wave velocity model and a shear wave velocity model, specifically including: establishing a longitudinal velocity interface on a time domain based on the pressure wave imaging data, and establishing a shear wave velocity interface on the time domain based on the shear wave imaging data; inputting a pressure wave initial velocity in the pressure wave velocity interface to obtain a pressure wave velocity model; inputting a shear wave initial velocity in the shear wave velocity interface to obtain a shear wave velocity model; performing a prestack depth migration operation based on the pressure wave velocity model to obtain pressure wave data CIP trace gather; performing a prestack depth migration operation based on the shear wave velocity model to obtain shear wave data CIP trace gather; performing iterative velocity analysis on the pressure wave data after the wave field recovery operation is performed, by the pressure wave data CIP trace gather, to obtain a pressure wave velocity model; performing iterative velocity analysis on the shear wave data after the wave field recovery operation is performed, by the shear wave data CIP trace gather, to obtain a shear wave velocity model.

In the embodiment, on the basis that an omnidirectional vector geophone is applied for collecting omnidirectional vector seismic data, separation of divergence from curl of seismic wave is performed, by divergence and curl processing analysis, pure pressure wave information including no shear wave vibration signal (curl) and pure shear wave information including no expansion-contraction vibration signal (divergence) are finally formed, the pressure wave and the shear wave are separately subject to an imaging process and thus to joint inversion and explanation and other similar works, which solves the problem of the existing seismic exploration technology that cannot measure and process divergence data and curl data of seismic wave field, so as to improve construction, lithology, fluid exploration accuracy and reliability and promote seismic exploration to be developed from structural exploration to lithology exploration and fluid exploration.

Embodiment 3

Based on the same inventive concept, the embodiment further provides an omnidirectional vector seismic data processing apparatus which can be used for realizing the method described in the above embodiment, as described in the embodiment below. Because the omnidirectional vector seismic data processing apparatus solves problem based on the principle similar to the omnidirectional vector seismic data processing method, implementation of the omnidirectional vector seismic data processing apparatus can be reflected from the implementation of the omnidirectional vector seismic data processing method, with repetitive portions not presented here. As used below, the term "unit" or "module" can realize combination of software and/or hardware with predetermined functions. Although preferably the system described in the following embodiment is implemented by software, implementation by hardware, or combination of software and hardware is also possible and is conceivable.

Figure 14:
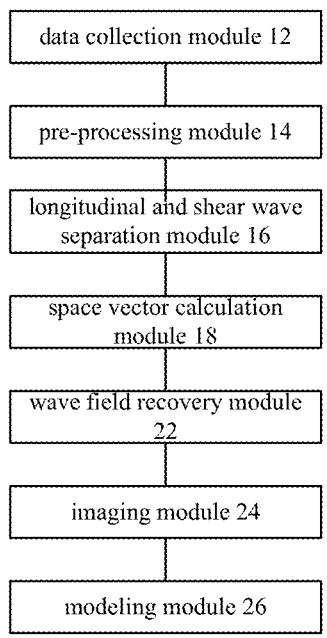
FIG. 14 is a structural schematic diagram of an omnidirectional vector seismic data processing apparatus based on an embodiment of the invention.

FIG. 14 is a structural schematic diagram of an omnidirectional vector seismic data processing apparatus based on an embodiment of the invention. The apparatus is used in an omnidirectional vector geophone whose structure has been introduced in the above and will not be repeated here. As shown in FIG. 14, the apparatus comprises: a data collection module 12, a pre-processing module 14, a pressure and shear wave separation module 16, a space vector calculation module 18, a wave field recovery module, an imaging module 24 and a modeling module 26. Functions of the modules are introduced below:

a data collection module 12 for collecting omnidirectional vector seismic data of the omnidirectional vector geophone;

a pre-processing module 14, connected to the data collection module 12, and for performing a pre-processing operation on the omnidirectional vector seismic data;

a pressure and shear wave separation module 16, connected to the pre-processing module 14, and for performing pressure and shear waves separation operation on the omnidirectional vector seismic data after the data is subject to the pre-processing operation, to obtain pressure wave data and shear wave data;

a space vector calculation module 18, connected to the pressure and shear wave separation module 16, and for performing space vector calculation on the pressure wave data and the shear wave data;

a wave field recovery module 22, connected to the pressure and shear wave separation module 16, and for performing a wave field recovery operation on the pressure wave data and the shear wave data after they are subject to the space vector calculation, wherein the wave field recovery operation includes a statics correction and a deconvolution operation;

an imaging module 24, connected to the wave field recovery module 22, and for performing an imaging operation based on the pressure wave data and the shear wave that are subject to the wave field recovery operation, to obtain pressure wave imaging data and shear wave imaging data;

a modeling module 26, connected to the imaging module 24, and for performing modeling based on the pressure wave data and the shear wave data that are subject to the wave field recovery operation and the pressure wave imaging data and the shear wave imaging data, to obtain a pressure wave velocity model and a shear wave velocity model.

In the embodiment, on the basis that the omnidirectional vector seismic data is collected by the omnidirectional vector geophone, pressure wave data and shear wave data of the seismic wave are processed, which solves the problem of the existing seismic exploration technology that cannot measure and process divergence data and curl data of seismic wave field, so as to improve construction, lithology, fluid exploration accuracy and reliability and promote seismic exploration to be developed from structural exploration to lithology exploration and fluid exploration.

In the embodiment, the pre-processing module 14 includes: a quality control unit for using an omnidirectional vector observation system to check whether the collected omnidirectional vector seismic data conforms to quality control condition or not; and a storage unit for classifying and storing the omnidirectional vector seismic data that conforms to the quality control condition. Based on this, the quality control condition can be set as needed, so as to filtrate the omnidirectional vector seismic data to be beneficial to the subsequent data processing.

In the embodiment, the pressure and shear wave separation module 16 includes: a shear wave separation unit for obtaining a total translational vibration amount based on the omnidirectional vector wave detector that conforms to the quality control condition, and obtaining a shear wave translational vibration component based on the curl data of the omnidirectional vector geophone, and obtaining shear wave data based on the shear wave translational vibration component; a pressure wave separation unit for reducing the shear wave translational vibration component from the total translational vibration amount to obtain a pressure wave translational vibration component, and obtaining pressure wave data based on the pressure wave translational vibration component. Based on this, the pressure wave data and the shear wave data can be separated accurately, which solves the problem of the existing seismic exploration technology that cannot measure and process divergence data and curl data of seismic wave field.

In the embodiment, the space vector calculation module 18 includes: a pressure wave data calculation unit for, in a vector direction, sorting and outputting pressure wave data in different directions based on the azimuthal angle and the dip angle; a shear wave data calculation unit for, in the vector direction, sorting and outputting shear wave data in different directions based on the azimuthal angle and the dip angle; reducing ground shear wave data from the shear wave data in different directions to obtain effective shear wave data in different directions. Based on this, space vectors of the pressure wave data and the shear wave data are calculated, which provides basis for the subsequent wave field recovery operation.

In the embodiment, the wave field recovery module 22 includes: a pressure wave calculation unit for, based on the pressure wave data in different directions, directionally calculating pressure wave surface consistent statics and shear wave surface consistent deconvolution factor; and generating pressure wave data after the wave field recovery operation is performed, directionally based on pressure wave surface consistent statics and pressure wave surface consistent deconvolution factor; and a shear wave calculation unit for, based on the effective shear wave data in different directions, directionally calculating shear wave ground surface directional consistency static correction amount and shear wave ground surface directional consistency deconvolution factor; and generating shear wave data after the wave field recovery operation is performed, directionally based on shear wave surface consistent statics and shear wave surface consistent deconvolution factor. Based on this, wave field recovery operation is performed on the pressure wave data and the shear wave data, which provides basis for the subsequent imaging operation.

In the embodiment, the imaging module 24 includes: a pressure wave imaging unit for forming a pressure wave imaging section plane or a pressure wave imaging three-dimensional body based on the pressure wave data after the wave field recovery operation is performed; and a shear wave imaging unit for forming a shear wave imaging section plane or a shear wave imaging three-dimensional body based on the shear wave data after the wave field recovery operation is performed. Based on this, data support is provided for the subsequent modeling.

In the embodiment, the modeling module 26 includes: an interface establishment unit for establishing a pressure wave velocity interface on a time domain based on the pressure wave imaging data, and establishing a shear wave velocity interface on the time domain based on the shear wave imaging data; a model establishment unit for inputting a pressure wave initial velocity in the pressure wave velocity interface to obtain a pressure wave velocity model; and inputting a shear wave initial velocity in the shear wave velocity interface to obtain a shear wave velocity model; a prestack depth migration operation unit for performing a prestack depth migration operation based on the pressure wave velocity model to obtain pressure wave data CIP trace gather; and performing a prestack depth migration operation based on the shear wave velocity model to obtain shear wave data CIP trace gather; a velocity model generation unit for performing iterative velocity analysis on the pressure wave data after the wave field recovery operation is performed, by the pressure wave data CIP trace gather, to obtain a pressure wave velocity model; and performing iterative velocity analysis on the shear wave data after the wave field recovery operation is performed, by the shear wave data CIP trace gather, to obtain a shear wave velocity model.

Of course, the above-described module division is merely a schematic division, and the invention is not limited to this. Any module division should belong to the protection scope of the invention as long as it can realize the purpose of the invention.

The embodiment of the invention further provides a computer-readable storage medium including computer-readable instructions, applied to the above-described omnidirectional vector geophone, the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface; wherein, when being executed, the computer-readable instructions cause a processor to execute at least the following operations:

collecting omnidirectional vector seismic data of the omnidirectional vector geophone, and performing a pre-processing operation on the omnidirectional vector seismic data;

performing pressure and shear waves separation operation on the omnidirectional vector seismic data after the data is subject to the pre-processing operation, to obtain pressure wave data and shear wave data;

performing space vector calculation and wave field recovery operation on the pressure wave data and the shear wave data, wherein the wave field recovery operation includes a statics correction and a deconvolution operation;

performing an imaging operation based on the pressure wave data and the shear wave that are subject to the wave field recovery operation, to obtain pressure wave imaging data and shear wave imaging data;

performing modeling based on the pressure wave data and the shear wave data that are subject to the wave field recovery operation and the pressure wave imaging data and the shear wave imaging data, to obtain a pressure wave velocity model and a shear wave velocity model.

In one embodiment, the computer-readable instructions, when being executed, cause a processor to perform a pre-processing operation on the omnidirectional vector seismic data, including:

using an omnidirectional vector observation system to check whether the collected omnidirectional vector seismic data conforms to quality control condition or not;

classifying and storing the omnidirectional vector seismic data that conforms to the quality control condition.

In one embodiment, the computer-readable instructions, when being executed, cause the processor to perform pressure and shear waves separation operation on the omnidirectional vector seismic data after the data is subject to the pre-processing operation, to obtain pressure wave data and shear wave data, including:

obtaining a total translational vibration amount based on the omnidirectional vector wave detector that conforms to the quality control condition;

obtaining a shear wave translational vibration component based on the curl data of the omnidirectional vector geophone, and obtaining shear wave data based on the shear wave translational vibration component;

reducing the shear wave translational vibration component from the total translational vibration amount to obtain a pressure wave translational vibration component, and obtaining pressure wave data based on the pressure wave translational vibration component.

In one embodiment, the computer-readable instructions, when being executed, cause a processor to perform space vector calculation on the pressure wave data and the shear wave data, including:

in a vector direction, sorting and outputting pressure wave data in different directions based on the azimuthal angle and the dip angle;

in the vector direction, sorting and outputting shear wave data in different directions based on the azimuthal angle and the dip angle;

reducing ground shear wave data from the shear wave data in different directions to obtain effective shear wave data in different directions.

In one embodiment, the computer-readable instructions, when being executed, cause a processor to perform wave field recovery operation on the pressure wave data and the shear wave data, including:

based on the pressure wave data in different directions, directionally calculating pressure wave surface consistent statics and shear wave surface consistent deconvolution factor;

based on the effective shear wave data in different directions, directionally calculating shear wave ground surface directional consistency static correction amount and shear wave ground surface directional consistency deconvolution factor;

generating pressure wave data after the wave field recovery operation is performed, directionally based on pressure wave surface consistent statics and pressure wave surface consistent deconvolution factor;

generating shear wave data after the wave field recovery operation is performed, directionally based on shear wave surface consistent statics and shear wave surface consistent deconvolution factor.

In one embodiment, the computer-readable instructions, when being executed, cause a processor to perform an imaging operation based on the pressure wave data and the shear wave that are subject to the wave field recovery operation, including:

forming a pressure wave imaging section plane or a pressure wave imaging three-dimensional body based on the pressure wave data after the wave field recovery operation is performed;

forming a shear wave imaging section plane or a shear wave imaging three-dimensional body based on the shear wave data after the wave field recovery operation is performed.

In one embodiment, the computer-readable instructions, when being executed, cause a processor to perform modeling based on the pressure wave data and the shear wave data that are subject to the wave field recovery operation, and the pressure wave imaging data and the shear wave imaging data, to obtain a pressure wave velocity model and a shear wave velocity model, including:

establishing a longitudinal velocity interface on a time domain based on the pressure wave imaging data, and establishing a shear wave velocity interface on the time domain based on the shear wave imaging data;

inputting a pressure wave initial velocity in the pressure wave velocity interface to obtain a pressure wave velocity model; and inputting a shear wave initial velocity in the shear wave velocity interface to obtain a shear wave velocity model;

performing a prestack depth migration operation based on the pressure wave velocity model to obtain pressure wave data CIP trace gather; and performing a prestack depth migration operation based on the shear wave velocity model to obtain shear wave data CIP trace gather;

performing iterative velocity analysis on the pressure wave data after the wave field recovery operation is performed, by the pressure wave data CIP trace gather, to obtain a pressure wave velocity model; and performing iterative velocity analysis on the shear wave data after the wave field recovery operation is performed, by the shear wave data CIP trace gather, to obtain a shear wave velocity model.

Figure 15:
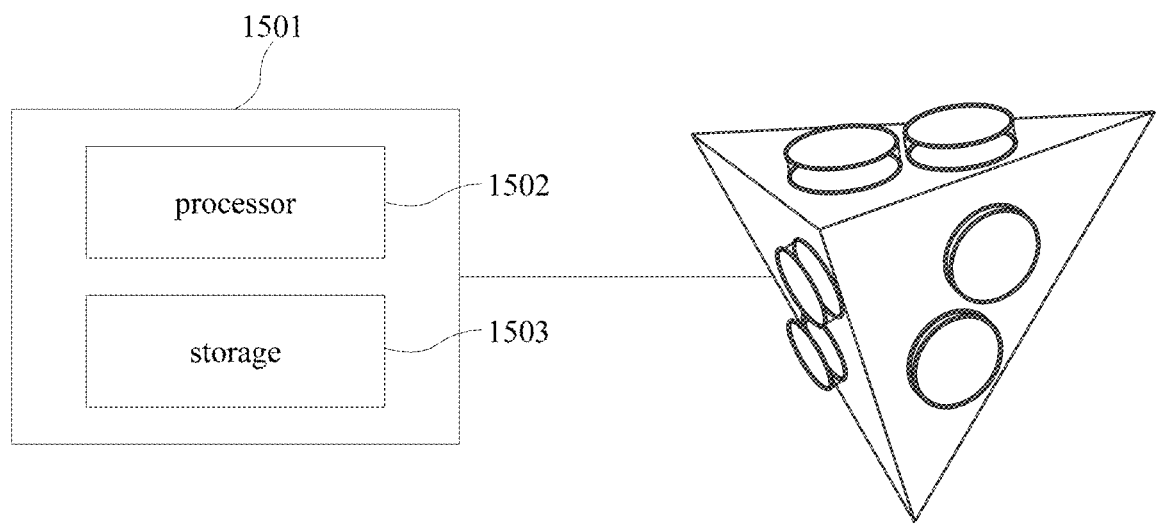
FIG. 15 is a structural schematic diagram of a device based on an embodiment of the invention.

As shown in FIG. 15, the embodiment of the invention further provides a device 1501, applied to the above-described omnidirectional vector geophone, the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface; wherein the device comprises:

a processor 1502; and a storage 1503 including computer-readable instructions, when being executed, the computer-readable instructions cause the processor 1502 to execute the following operations:

collecting omnidirectional vector seismic data of the omnidirectional vector geophone, and performing a pre-processing operation on the omnidirectional vector seismic data;

performing pressure and shear waves separation operation on the omnidirectional vector seismic data after the data is subject to the pre-processing operation, to obtain pressure wave data and shear wave data;

performing space vector calculation and wave field recovery operation on the pressure wave data and the shear wave data, wherein the wave field recovery operation includes a statics correction and a deconvolution operation;

performing an imaging operation based on the pressure wave data and the shear wave that are subject to the wave field recovery operation, to obtain pressure wave imaging data and shear wave imaging data;

performing modeling based on the pressure wave data and the shear wave data that are subject to the wave field recovery operation and the pressure wave imaging data and the shear wave imaging data, to obtain a pressure wave velocity model and a shear wave velocity model.

In one embodiment, the computer-readable instructions, when being executed, cause a processor to perform a pre-processing operation on the omnidirectional vector seismic data, including:

using an omnidirectional vector observation system to check whether the collected omnidirectional vector seismic data conforms to quality control condition or not;

classifying and storing the omnidirectional vector seismic data that conforms to the quality control condition.

In one embodiment, the computer-readable instructions, when being executed, cause the processor to perform pressure and shear waves separation operation on the omnidirectional vector seismic data after the data is subject to the pre-processing operation, to obtain pressure wave data and shear wave data, including:

obtaining a total translational vibration amount based on the omnidirectional vector wave detector that conforms to the quality control condition;

obtaining a shear wave translational vibration component based on the curl data of the omnidirectional vector geophone, and obtaining shear wave data based on the shear wave translational vibration component;

reducing the shear wave translational vibration component from the total translational vibration amount to obtain a pressure wave translational vibration component, and obtaining pressure wave data based on the pressure wave translational vibration component.

In one embodiment, the computer-readable instructions, when being executed, cause a processor to perform space vector calculation on the pressure wave data and the shear wave data, including:

in a vector direction, sorting and outputting pressure wave data in different directions based on the azimuthal angle and the dip angle;

in the vector direction, sorting and outputting shear wave data in different directions based on the azimuthal angle and the dip angle;

reducing ground shear wave data from the shear wave data in different directions to obtain effective shear wave data in different directions.

In one embodiment, the computer-readable instructions, when being executed, cause a processor to perform wave field recovery operation on the pressure wave data and the shear wave data, including:

based on the pressure wave data in different directions, directionally calculating pressure wave surface consistent statics and shear wave surface consistent deconvolution factor;

based on the effective shear wave data in different directions, directionally calculating shear wave ground surface directional consistency static correction amount and shear wave ground surface directional consistency deconvolution factor;

generating pressure wave data after the wave field recovery operation is performed, directionally based on pressure wave surface consistent statics and pressure wave surface consistent deconvolution factor;

generating shear wave data after the wave field recovery operation is performed, directionally based on shear wave surface consistent statics and shear wave surface consistent deconvolution factor.

In one embodiment, the computer-readable instructions, when being executed, cause a processor to perform an imaging operation based on the pressure wave data and the shear wave that are subject to the wave field recovery operation, including:

forming a pressure wave imaging section plane or a pressure wave imaging three-dimensional body based on the pressure wave data after the wave field recovery operation is performed;

forming a shear wave imaging section plane or a shear wave imaging three-dimensional body based on the shear wave data after the wave field recovery operation is performed.

In one embodiment, the computer-readable instructions, when being executed, cause a processor to perform modeling based on the pressure wave data and the shear wave data that are subject to the wave field recovery operation, and the pressure wave imaging data and the shear wave imaging data, to obtain a pressure wave velocity model and a shear wave velocity model, including:

establishing a longitudinal velocity interface on a time domain based on the pressure wave imaging data, and establishing a shear wave velocity interface on the time domain based on the shear wave imaging data;

inputting a pressure wave initial velocity in the pressure wave velocity interface to obtain a pressure wave velocity model; and inputting a shear wave initial velocity in the shear wave velocity interface to obtain a shear wave velocity model;

performing a prestack depth migration operation based on the pressure wave velocity model to obtain pressure wave data CIP trace gather; and performing a prestack depth migration operation based on the shear wave velocity model to obtain shear wave data CIP trace gather;

performing iterative velocity analysis on the pressure wave data after the wave field recovery operation is performed, by the pressure wave data CIP trace gather, to obtain a pressure wave velocity model; and performing iterative velocity analysis on the shear wave data after the wave field recovery operation is performed, by the shear wave data CIP trace gather, to obtain a shear wave velocity model.

In order to fully collect amplitude, frequency, phase, vibration direction and propagation direction of the seismic wave field, and divergence and curl of a mass point force field, to develop holographic study on the seismic wave field, the present invention provides a seismic omnidirectional vector exploration technology that collects, processes and images the omnidirectional vector seismic data, can achieve the following purposes of:

1. adding functions of collecting divergence, curl, line vector and curl vector of the seismic wave, on the basis of the traditional collection technology;

2. improving degree of purity of pressure and shear waves separation as compared with the traditional processing technology;

3. improving the signal-to-noise ratio of seismic data collected on land, especially complex mountainous areas;

4. improving fidelity of the seismic data;

5. laying foundations for application of full elastic wave seismic imaging and extraction of elastic parameters, taking the omnidirectional vector seismic data as input;

6. laying foundations for application of inversion technologies such as Full wave information inversion (FWI), lithology or the like;

7. realizing extraction of omnidirectional vector seismic attributes, improving accuracy and reliability of rock and fluid prediction.

In the existing traditional seismic exploration, utilizing difference between elasticity and density of an underground medium, the seismic wave is excited artificially on ground surface, when propagating down to the ground, the seismic wave meets a rock stratum boundary surfaces with different medium properties, the seismic wave may be reflected and refracted and such seismic wave is received by the wave detector on ground surface or in the well. The record of the seismic wave is processed and explained to infer nature and form of underground rock formations. Originating from the optical reflection theory, since the 20s of the last century, technologies of two-dimensional and three-dimensional observation have been developed.

The technical solution of the invention is provided from consideration of complexity of the seismic wave field, and it is difficult to solve shear wave separation or to record full information of analysis of the seismic wave field by the traditional seismic observation method. In order to improve the signal-to-noise ratio of seismic data of overland complex ground surface to obtain more abundant information of the seismic wave field, divergence, curl, direction, size, time information of the wave are recorded from a data collection source, which is a revolutionary leaping development of the traditional seismic exploration technology at the same time of being based on the traditional seismic exploration technology.

Key features of the invention are to record omnidirectional wave field information by an omnidirectional wave detector in the open, to perform separation of pressure and shear waves by a special seismic signal processing means, to image the pressure and shear waves separately and jointly, to improve signal-to-noise ratio, sensitivity and fidelity of the seismic signal, to improve construction image accuracy, to perform attribute pickup, analysis and invention separately and jointly on the pressure and shear waves, to improve physical information quantity of seismic attributes and to improve lithology and fluid prediction accuracy.

In the invention, on the basis that an omnidirectional vector geophone is applied for collecting omnidirectional vector seismic data, separation of divergence from curl of seismic wave is performed, by divergence and curl processing analysis, pure pressure wave information including no shear wave vibration signal (curl) and pure shear wave information including no expansion-contraction vibration signal (divergence) are finally formed, the pressure wave and the shear wave are separately subject to an imaging process and thus to joint inversion and explanation and other similar works, which solves the problem of the existing seismic exploration technology that cannot measure and process divergence data and curl data of seismic wave field, so as to improve construction, lithology, fluid exploration accuracy and reliability and promote seismic exploration to be developed from structural exploration to lithology exploration and fluid exploration. The present invention is greatly different from the existing seismic exploration technology in terms of a theoretical basis, data properties, structure, format, amount of information or the like, is a new series of seismic exploration technologies and represents the developing direction of the seismic exploration technology.

The invention is applicable to fields such as artificial seismic exploration, natural earthquake monitoring, natural disaster monitoring or the like of onland various resources. The invention has the following application prospect: because curl of seismic wave can be detected, vibration direction and real amplitude of the wave field can be obtained, pure pressure and shear waves can be decomposed, abundant seismic wave information never seen before can thus be obtained to recover nature features of the wave field, thereby not only improving signal-to-noise ratio, sensitivity and fidelity of the seismic signal but also supplying more abundant seismic attributes, which thus will improve accuracy of resource exploration, reliability of natural earthquake intensity and severity monitoring, and can play the role in mine resources production safety monitoring. Further research and application of the technology will certainly popularize revolutionary development of the geophysical technique, and will play a more important role in exploration of complex underground mineral resources, dynamic monitoring of natural disasters and production safety monitoring of our country.

In the description, reference terms "one embodiment", "some embodiments", "example", "specific example" or "some examples" are used to mean that specific features, structures, materials or characteristics described by combining the embodiment or example are included in at least one embodiment or example of the invention. In the description, exemplary expression of the above terms does not necessarily refer to the same embodiment or example. Moreover, the described specific features, structures, materials or characteristics may be combined in a suitable manner in any one or more of the embodiments or examples.

The purpose, technical solution and beneficial effect of the invention have been further described in detail in the above specific embodiments, it should be understood that the above contents are merely specific embodiments of the invention and are not for limiting protection scope of the invention, and any modifications, equivalent replacements, improvements etc. within the spirit and principle of the present invention shall be included within the protection scope of the present invention.

The invention claimed is:

1. An omnidirectional vector seismic data processing method, applied to an omnidirectional vector geophone, wherein the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface;

the method comprising:
collecting omnidirectional vector seismic data of the omnidirectional vector geophone, and performing a pre-processing operation on the omnidirectional vector seismic data;
performing pressure and shear waves separation operation on the omnidirectional vector seismic data after the data is subject to the pre-processing operation, to obtain pressure wave data and shear wave data;
performing space vector calculation and wave field recovery operation on the pressure wave data and the shear wave data, wherein the wave field recovery operation includes a statics correction and a deconvolution operation;

performing an imaging operation based on the pressure wave data and the shear wave that are subject to the wave field recovery operation, to obtain pressure wave imaging data and shear wave imaging data;
performing modeling based on the pressure wave data and the shear wave data that are subject to the wave field recovery operation and the pressure wave imaging data and the shear wave imaging data, to obtain a pressure wave velocity model and a shear wave velocity model.

2. The omnidirectional vector seismic data processing method according to claim 1, wherein performing a pre-processing operation on the omnidirectional vector seismic data includes:
using an omnidirectional vector observation system to check whether the collected omnidirectional vector seismic data conforms to quality control condition or not;
classifying and storing the omnidirectional vector seismic data that conforms to the quality control condition.

3. The omnidirectional vector seismic data processing method according to claim 2, wherein performing pressure and shear waves separation operation on the omnidirectional vector seismic data after the data is subject to the pre-processing operation, to obtain pressure wave data and shear wave data, includes:
obtaining a total translational vibration amount based on the omnidirectional vector wave detector that conforms to the quality control condition;
obtaining a shear wave translational vibration component based on the curl data of the omnidirectional vector geophone, and obtaining shear wave data based on the shear wave translational vibration component;
reducing the shear wave translational vibration component from the total translational vibration amount to obtain a pressure wave translational vibration component, and obtaining pressure wave data based on the pressure wave translational vibration component.

4. The omnidirectional vector seismic data processing method according to claim 1, wherein performing space vector calculation on the pressure wave data and the shear wave data includes:
in a vector direction, sorting and outputting pressure wave data in different directions based on the azimuthal angle and the dip angle;
in the vector direction, sorting and outputting shear wave data in different directions based on the azimuthal angle and the dip angle;
reducing ground shear wave data from the shear wave data in different directions to obtain effective shear wave data in different directions.

5. The omnidirectional vector seismic data processing method according to claim 4, wherein performing wave field recovery operation on the pressure wave data and the shear wave data includes:
based on the pressure wave data in different directions, directionally calculating pressure wave surface consistent statics and pressure wave surface consistent deconvolution factor;
based on the effective shear wave data in different directions, directionally calculating shear wave surface consistent statics and shear wave surface consistent deconvolution factor;
generating pressure wave data after the wave field recovery operation is performed, directionally based on pressure wave surface consistent statics and pressure wave surface consistent deconvolution factor;

generating shear wave data after the wave field recovery operation is performed, directionally based on shear wave surface consistent statics and shear wave surface consistent deconvolution factor.

6. The omnidirectional vector seismic data processing method according to claim 1, wherein performing an imaging operation based on the pressure wave data and the shear wave that are subject to the wave field recovery operation includes:
forming a pressure wave imaging section plane or a pressure wave imaging three-dimensional body based on the pressure wave data after the wave field recovery operation is performed;
forming a shear wave imaging section plane or a shear wave imaging three-dimensional body based on the shear wave data after the wave field recovery operation is performed.

7. The omnidirectional vector seismic data processing method according to claim 1, wherein performing modeling based on the pressure wave data and the shear wave data that are subject to the wave field recovery operation, and the pressure wave imaging data and the shear wave imaging data, to obtain a pressure wave velocity model and a shear wave velocity model, includes:
establishing a longitudinal velocity interface on a time domain based on the pressure wave imaging data, and establishing a shear wave velocity interface on the time domain based on the shear wave imaging data;
inputting a pressure wave initial velocity in the pressure wave velocity interface to obtain a pressure wave velocity model; and inputting a shear wave initial velocity in the shear wave velocity interface to obtain a shear wave velocity model;
performing a prestack depth migration operation based on the pressure wave velocity model to obtain pressure wave data CIP trace gather; and performing a prestack depth migration operation based on the shear wave velocity model to obtain shear wave data CIP trace gather;
performing iterative velocity analysis on the pressure wave data after the wave field recovery operation is performed, by the pressure wave data CIP trace gather, to obtain a pressure wave velocity model; and performing iterative velocity analysis on the shear wave data after the wave field recovery operation is performed, by the shear wave data CIP trace gather, to obtain a shear wave velocity model.

8. A computer-readable storage medium including computer-readable instructions, applied to an omnidirectional vector geophone, the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface; wherein, when being executed, the computer-readable instructions cause a processor to execute at least the following operations:
collecting omnidirectional vector seismic data of the omnidirectional vector geophone, and performing a pre-processing operation on the omnidirectional vector seismic data;
performing pressure and shear waves separation operation on the omnidirectional vector seismic data after the data is subject to the pre-processing operation, to obtain pressure wave data and shear wave data;
performing space vector calculation and wave field recovery operation on the pressure wave data and the shear wave data, wherein the wave field recovery operation includes a statics correction and a deconvolution operation;
performing an imaging operation based on the pressure wave data and the shear wave that are subject to the wave field recovery operation, to obtain pressure wave imaging data and shear wave imaging data;
performing modeling based on the pressure wave data and the shear wave data that are subject to the wave field recovery operation and the pressure wave imaging data and the shear wave imaging data, to obtain a pressure wave velocity model and a shear wave velocity model.

9. The computer-readable storage medium according to claim 8, wherein, when being executed, the computer-readable instructions cause a processor to perform a pre-processing operation on the omnidirectional vector seismic data, including:
using an omnidirectional vector observation system to check whether the collected omnidirectional vector seismic data conforms to quality control condition or not;
classifying and storing the omnidirectional vector seismic data that conforms to the quality control condition.

10. The computer-readable storage medium according to claim 9, wherein, when being executed, cause the processor to perform pressure and shear waves separation operation on the omnidirectional vector seismic data after the data is subject to the pre-processing operation, to obtain pressure wave data and shear wave data, including:
obtaining a total translational vibration amount based on the omnidirectional vector wave detector that conforms to the quality control condition;
obtaining a shear wave translational vibration component based on the curl data of the omnidirectional vector geophone, and obtaining shear wave data based on the shear wave translational vibration component;
reducing the shear wave translational vibration component from the total translational vibration amount to obtain a pressure wave translational vibration component, and obtaining pressure wave data based on the pressure wave translational vibration component.

11. The computer-readable storage medium according to claim 8, wherein, when being executed, the computer-readable instructions cause a processor to perform space vector calculation on the pressure wave data and the shear wave data, including:
in a vector direction, sorting and outputting pressure wave data in different directions based on the azimuthal angle and the dip angle;
in the vector direction, sorting and outputting shear wave data in different directions based on the azimuthal angle and the dip angle;
reducing ground shear wave data from the shear wave data in different directions to obtain effective shear wave data in different directions.

12. The computer-readable storage medium according to claim 11, wherein, when being executed, the computer-readable instructions cause a processor to perform wave field recovery operation on the pressure wave data and the shear wave data, including:

based on the pressure wave data in different directions, directionally calculating pressure wave surface consistent statics and shear wave surface consistent deconvolution factor;

based on the effective shear wave data in different directions, directionally calculating shear wave ground surface directional consistency static correction amount and shear wave ground surface directional consistency deconvolution factor;

generating pressure wave data after the wave field recovery operation is performed, directionally based on pressure wave surface consistent statics and pressure wave surface consistent deconvolution factor;

generating shear wave data after the wave field recovery operation is performed, directionally based on shear wave surface consistent statics and shear wave surface consistent deconvolution factor.

13. The computer-readable storage medium according to claim 8, wherein, when being executed, the computer-readable instructions cause a processor to perform an imaging operation based on the pressure wave data and the shear wave that are subject to the wave field recovery operation, including:

forming a pressure wave imaging section plane or a pressure wave imaging three-dimensional body based on the pressure wave data after the wave field recovery operation is performed;

forming a shear wave imaging section plane or a shear wave imaging three-dimensional body based on the shear wave data after the wave field recovery operation is performed.

14. The computer-readable storage medium according to claim 8, wherein, when being executed, cause a processor to perform modeling based on the pressure wave data and the shear wave data that are subject to the wave field recovery operation, and the pressure wave imaging data and the shear wave imaging data, to obtain a pressure wave velocity model and a shear wave velocity model, including:

establishing a longitudinal velocity interface on a time domain based on the pressure wave imaging data, and establishing a shear wave velocity interface on the time domain based on the shear wave imaging data;

inputting a pressure wave initial velocity in the pressure wave velocity interface to obtain a pressure wave velocity model; and inputting a shear wave initial velocity in the shear wave velocity interface to obtain a shear wave velocity model;

performing a prestack depth migration operation based on the pressure wave velocity model to obtain pressure wave data CIP trace gather; and performing a prestack depth migration operation based on the shear wave velocity model to obtain shear wave data CIP trace gather;

performing iterative velocity analysis on the pressure wave data after the wave field recovery operation is performed, by the pressure wave data CIP trace gather, to obtain a pressure wave velocity model; and performing iterative velocity analysis on the shear wave data after the wave field recovery operation is performed, by the shear wave data CIP trace gather, to obtain a shear wave velocity model.

15. A device applied to an omnidirectional vector geophone, the omnidirectional vector geophone comprises: eight wave detectors and support structures thereof, the support structures are used for supporting the eight wave detectors such that bottom surfaces of each two wave detectors are on one of regular triangular surfaces of a regular tetrahedron, crossing points of working shafts of the two wave detectors that are on the same regular triangular surface that cross with the regular triangular surface are both on an angular bisector of an angle of the regular triangular surface and are symmetric with respect to a center of the regular triangular surface; wherein the device comprises:

a processor; and a storage including computer-readable instructions, when being executed, the computer-readable instructions cause the processor to execute the following operations:

collecting omnidirectional vector seismic data of the omnidirectional vector geophone, and performing a pre-processing operation on the omnidirectional vector seismic data;

performing pressure and shear waves separation operation on the omnidirectional vector seismic data after the data is subject to the pre-processing operation, to obtain pressure wave data and shear wave data;

performing space vector calculation and wave field recovery operation on the pressure wave data and the shear wave data, wherein the wave field recovery operation includes a statics correction and a deconvolution operation;

performing an imaging operation based on the pressure wave data and the shear wave that are subject to the wave field recovery operation, to obtain pressure wave imaging data and shear wave imaging data;

performing modeling based on the pressure wave data and the shear wave data that are subject to the wave field recovery operation and the pressure wave imaging data and the shear wave imaging data, to obtain a pressure wave velocity model and a shear wave velocity model.

16. The device according to claim 15, wherein, when being executed, the computer-readable instructions cause a processor to perform a pre-processing operation on the omnidirectional vector seismic data, including:

using an omnidirectional vector observation system to check whether the collected omnidirectional vector seismic data conforms to quality control condition or not;

classifying and storing the omnidirectional vector seismic data that conforms to the quality control condition.

17. The device according to claim 16, wherein, when being executed, cause the processor to perform pressure and shear waves separation operation on the omnidirectional vector seismic data after the data is subject to the pre-processing operation, to obtain pressure wave data and shear wave data, including:

obtaining a total translational vibration amount based on the omnidirectional vector wave detector that conforms to the quality control condition;

obtaining a shear wave translational vibration component based on the curl data of the omnidirectional vector geophone, and obtaining shear wave data based on the shear wave translational vibration component;

reducing the shear wave translational vibration component from the total translational vibration amount to obtain a pressure wave translational vibration component, and obtaining pressure wave data based on the pressure wave translational vibration component.

18. The device according to claim 15, wherein, when being executed, the computer-readable instructions cause a processor to perform space vector calculation on the pressure wave data and the shear wave data, including:

in a vector direction, sorting and outputting pressure wave data in different directions based on the azimuthal angle and the dip angle;

in the vector direction, sorting and outputting shear wave data in different directions based on the azimuthal angle and the dip angle;

reducing ground shear wave data from the shear wave data in different directions to obtain effective shear wave data in different directions.

19. The device according to claim 18, wherein, when being executed, the computer-readable instructions cause a processor to perform wave field recovery operation on the pressure wave data and the shear wave data, including:

based on the pressure wave data in different directions, directionally calculating pressure wave surface consistent statics and shear wave surface consistent deconvolution factor;

based on the effective shear wave data in different directions, directionally calculating shear wave ground surface directional consistency static correction amount and shear wave ground surface directional consistency deconvolution factor;

generating pressure wave data after the wave field recovery operation is performed, directionally based on pressure wave surface consistent statics and pressure wave surface consistent deconvolution factor;

generating shear wave data after the wave field recovery operation is performed, directionally based on shear wave surface consistent statics and shear wave surface consistent deconvolution factor.

20. The device according to claim 15, wherein, when being executed, the computer-readable instructions cause a processor to perform an imaging operation based on the pressure wave data and the shear wave that are subject to the wave field recovery operation, including:

forming a pressure wave imaging section plane or a pressure wave imaging three-dimensional body based on the pressure wave data after the wave field recovery operation is performed;

forming a shear wave imaging section plane or a shear wave imaging three-dimensional body based on the shear wave data after the wave field recovery operation is performed.

21. The device according to claim 15, wherein, when being executed, cause a processor to perform modeling based on the pressure wave data and the shear wave data that are subject to the wave field recovery operation, and the pressure wave imaging data and the shear wave imaging data, to obtain a pressure wave velocity model and a shear wave velocity model, including:

establishing a longitudinal velocity interface on a time domain based on the pressure wave imaging data, and establishing a shear wave velocity interface on the time domain based on the shear wave imaging data;

inputting a pressure wave initial velocity in the pressure wave velocity interface to obtain a pressure wave velocity model; and inputting a shear wave initial velocity in the shear wave velocity interface to obtain a shear wave velocity model;

performing a prestack depth migration operation based on the pressure wave velocity model to obtain pressure wave data CIP trace gather; and performing a prestack depth migration operation based on the shear wave velocity model to obtain shear wave data CIP trace gather;

performing iterative velocity analysis on the pressure wave data after the wave field recovery operation is performed, by the pressure wave data CIP trace gather, to obtain a pressure wave velocity model; and performing iterative velocity analysis on the shear wave data after the wave field recovery operation is performed, by the shear wave data CIP trace gather, to obtain a shear wave velocity model.

* * * * *